(12) United States Patent
Peterson

(10) Patent No.: US 8,918,342 B1
(45) Date of Patent: *Dec. 23, 2014

(54) SYSTEM FOR CLOSED LOOP DECISIONMAKING IN AN AUTOMATED CARE SYSTEM

(71) Applicant: Convergys Customer Management Delaware LLC, Cincinnati, OH (US)

(72) Inventor: Dale R. Peterson, Cincinnati, OH (US)

(73) Assignee: Convergys Customer Management Delaware LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,365

(22) Filed: Apr. 29, 2013

Related U.S. Application Data

(63) Continuation of application No. 12/539,980, filed on Aug. 12, 2009, now Pat. No. 8,452,668, which is a continuation of application No. 11/276,497, filed on Mar. 2, 2006, now Pat. No. 7,599,861.

(51) Int. Cl.
*G06Q 30/00* (2012.01)
*G10L 15/06* (2013.01)

(52) U.S. Cl.
CPC .................................. *G10L 15/063* (2013.01)

USPC .......... 705/346; 705/1.1; 705/7.11; 705/26.7; 705/345; 705/35; 379/265.09; 379/242; 379/266.02; 709/206

(58) Field of Classification Search
USPC .................. 705/1.1, 7.11, 26.7, 35, 345, 346; 379/265.09, 242, 266.02; 709/206
See application file for complete search history.

(56) References Cited

U.S. PATENT DOCUMENTS

| | | | |
|---|---|---|---|
| 6,233,332 B1* | 5/2001 | Anderson et al. | 379/265.09 |
| 2002/0072921 A1* | 6/2002 | Boland et al. | 705/1 |
| 2011/0202472 A1* | 8/2011 | Wan et al. | 705/345 |

* cited by examiner

*Primary Examiner* — Yogesh C Garg
(74) *Attorney, Agent, or Firm* — Crowe & Dunlevy

(57) ABSTRACT

There is disclosed a system functional for operating and updating an interactive voice response self care system which utilizes various types of models. The system is capable of improving the performance of the self care system through updating the models used in that system in a closed loop manner. The system is also potentially configured to utilize input from a human agent, such as a customer service representative, to which a customer call is transferred by a self care system.

14 Claims, 12 Drawing Sheets

Figure 7

| N | Total | Number | | | | | Probability | | | | |
|---|---|---|---|---|---|---|---|---|---|---|---|
| | | A | CS | CU | IS | ID | A | CS | CU | IS | ID |
| 1 | 1200 | 0 | 300 | 0 | 0 | 20 | 0.0000 | 0.9512 | 0.0000 | 0.0000 | 0.0488 |
| 2 | 780 | 5 | 252 | 6 | 2 | 16 | 0.0000 | 0.8924 | 0.1035 | 0.0000 | 0.0041 |
| 3 | 511 | 10 | 28 | 12 | 1 | 1 | 0.0000 | 0.5773 | 0.2140 | 0.0000 | 0.0070 |
| 4 | 280 | 15 | 8 | 38 | 0 | 0 | 0.1053 | 0.2621 | 0.5040 | 0.0000 | 0.0085 |
| 5 | 74 | 20 | 0 | 25 | 0 | 0 | 0.3514 | 0.0570 | 0.4730 | 0.0000 | 0.1081 |
| 6 | 0 | 0 | 0 | 0 | 0 | 0 | 1.0000 | 0.0000 | 0.0000 | 0.0000 | 0.0000 |
| 7 | 0 | 0 | 0 | 0 | 0 | 0 | 0.0000 | 0.0000 | 0.0000 | 0.0000 | 0.0000 |
| 8 | 0 | 0 | 0 | 0 | 0 | 0 | 0.0000 | 0.0000 | 0.0000 | 0.0000 | 0.0000 |
| 9 | 0 | 0 | 0 | 0 | 0 | 0 | 0.0000 | 0.0000 | 0.0000 | 0.0000 | 0.0000 |
| 10 | 0 | 0 | 0 | 0 | 0 | 0 | 0.0000 | 0.0000 | 0.0000 | 0.0000 | 0.0000 |

|   |       | Number |     |     |     |     | Probability |        |        |        |        |
|---|-------|--------|-----|-----|-----|-----|-------------|--------|--------|--------|--------|
| N | Total | A      | CS  | CU  | IS  | IU  | A           | CS     | CU     | IS     | IU     |
| 1 | 2400  | 0      | 578 | 0   | 0   | 38  | 0.0000      | 0.8443 | 0.0000 | 0.0000 | 0.0557 |
| 2 | 1700  | 4      | 463 | 0   | 5   | 25  | 0.0614      | 0.7257 | 0.0100 | 0.0080 | 0.0410 |
| 3 | 1280  | 14     | 382 | 98  | 3   | 14  | 0.0704      | 0.8000 | 0.1700 | 0.0003 | 0.0400 |
| 4 | 777   | 23     | 244 | 72  | 1   | 17  | 0.0082      | 0.5714 | 0.2770 | 0.0013 | 0.0497 |
| 5 | 382   | 28     | 108 | 162 | 0   | 19  | 0.1330      | 0.4188 | 0.3978 | 0.0080 | 0.0000 |
| 6 | 25    | 17     | 0   | 0   | 0   | 0   | 1.0000      | 0.0000 | 0.0000 | 0.0000 | 0.0000 |
| 7 | 0     | 8      | 0   | 0   | 0   | 0   | 1.0000      | 0.0000 | 0.0000 | 0.0000 | 0.0000 |
| 8 | 0     | 0      | 0   | 0   | 0   | 0   | 0.0000      | 0.0000 | 0.0000 | 0.0000 | 0.0000 |
| 9 | 0     | 0      | 0   | 0   | 0   | 0   | 0.0000      | 0.0000 | 0.0000 | 0.0000 | 0.0000 |
| 10| 0     | 0      | 0   | 0   | 0   | 0   | 0.0000      | 0.0000 | 0.0000 | 0.0000 | 0.0000 |

SYSTEM FOR CLOSED LOOP DECISIONMAKING IN AN AUTOMATED CARE SYSTEM

CROSS-REFERENCE TO RELATED APPLICATION

This non-provisional patent application claims priority from and is a continuation application of U.S. Non-provisional patent application Ser. No. 12/539,980, filed on Aug. 12, 2009 to Peterson, which claims priority from and is a continuation application of U.S. Non-provisional patent application Ser. No. 11/276,497, filed on Mar. 2, 2006 to Peterson, the disclosures of which are hereby incorporated by reference in their entirety.

FIELD OF THE INVENTION

This invention is in the field interactive voice response (IVR) systems.

BACKGROUND OF THE INVENTION

Enterprises are continuously looking for ways to provide quality service to their customers while at the same time minimizing their customer service operations costs. In response to these concerns, many businesses have utilized Self Care Systems (SCSs), which are computerized systems which allow a customer interaction, such as the reporting of a problem with an existing service, to be performed in an automated manner. In order to increase the effectiveness of SCSs, many businesses utilize SCSs which have the ability to understand and make natural language statements, that is, to understand and make declarations or remarks in a human language such as English, French or Japanese, rather than requiring a customer to utilize a more artificial interface such as a touch tone menu system. Thus, when a call is received, the SCS generally begins the interaction by playing a prompt, which is an audio sequence requesting information from the customer, such as "How may I help you?" The interaction then continues with the customer making a series of statements, which are natural language communications that supply information or make requests, and the SCS playing a series of prompts until the interaction is complete.

While these SCSs are functional, they suffer from a number of weaknesses. While automatic speech recognition (ASR) and natural language understanding (NLU) software have reached a high level of sophistication, word recognition and context recognition are not perfect. This can lead to an SCS repeatedly prompting a customer for more information. This may cause frustration on the part of the customer, lead to a greater number of abandoned calls, and, potentially, lose revenue.

Because of technological deficiencies, many businesses supplement SCSs with assisted care systems (ACSs). These are systems that allow customers to interact directly with human agents. One type of system, in which an SCS is often supplemented with an ACS, is an interactive voice response (IVR) system. IVR systems interact with callers using natural language. However, augmenting SCSs with ACSs can lead to additional problems. For example, some SCSs prematurely transfer calls to ACSs. This may lead to increased costs associated with running the ACS. Even more troublesome are situations where an SCS is supplemented by an ACS which is made up of multiple agent groups, that is, by groups of one or more human operators with special training to process certain types of interactions. This creates the potential for an SCS to transfer a customer to an agent group which is not properly trained to process that customer's requests. An agent within the agent group is then required to assess the customer's needs and transfer the agent to a different group. Such improper transfers result in customer frustration and increase the costs of maintaining the ACS.

In addition to the above weaknesses, SCSs do not include any mechanism for automatically updating the software they use for processing natural language interactions. Thus, even if a particular type of statement is identified as particularly likely to result in a misdirected transfer, or in an unnecessary request for additional information, it would still be necessary to undertake a cumbersome manual update process in order to improve the SCS performance.

Certain embodiments of the present invention are designed to provide a solution to certain of the weaknesses set forth above.

SUMMARY OF THE INVENTION

Some embodiments of the invention of this application comprise a system comprising a computer memory containing one or more models utilized to process a customer interaction comprising one or more statements made by a customer and one or more prompts played for the customer. As used in this application, computer memory should be understood to include any device or medium, or combination of devices and media, which is capable of storing computer readable and/or executable instructions and/or data. In such embodiments, the system might further comprise a set of computer executable instructions configured to coordinate processing of the customer interaction, to maintain a set of context information related to the customer interaction, to create a data record comprising information related to the customer interaction, to store information from the data record in the computer memory, to utilize information stored in the computer memory to automatically create one or more model updates, and to automatically update one or more of the models using one or more of the model updates. As used in this application, set of computer executable instructions should be understood to include any combination of one or more computer instructions regardless of how organized, whether into one or more modules, one or more programs, a distributed system or any other organization.

Additional embodiments of the invention might include, either in addition to, or as an alternative to one or more of the components described above, an agent terminal operable to allow an agent to process a customer interaction which might, in addition to the statements described above, comprise statements made by the agent to the customer. Further, in some embodiment the set of computer executable instructions might be further configured to create a second data record, determine if the data record and the second data record contain information relating to the same customer interaction, and store information from the second data record in the computer memory. In some embodiments, the computer executable instructions might be configured such that, if the data record and the second data record contain information related to the same customer interaction, those data records would be correlated with one another.

In some embodiments, the computer executable instructions might be configured to make at least one recommendation regarding processing the customer interaction. In some embodiments, the computer executable instructions might identify a set of actions, and perform an evaluation of the desirability of the actions in the set of actions. In some embodiments where the computer executable instructions are configured to make the at least one recommendation regarding processing the customer interaction, that at least one recommendation might be based at least in part on the evaluation of the desirability of an action in the set of actions. In some embodiments, where the set of computer executable instructions are configured to make at least one recommendation related to processing a customer interaction, that at least one recommendation might be based on a means for evaluating options.

In some embodiments, one or more of the models stored in the computer memory might comprise a statistical prediction model, and, if the set of computer executable instructions is configured to make at least one recommendation related to the processing of a customer interaction, that at least one recommendation might be based at least in part on the statistical prediction model. In some embodiments where one or more of the models in the computer memory is a statistical prediction model, the one or more model updates created by the set of computer executable instructions might comprise an update for the statistical prediction model.

In some embodiments, the set of computer executable instructions might be configured to determine at least one word included in a statement from the one or more customer statements. In some embodiments, the one or more models in the computer memory might comprise a statistical language model. In some embodiments in which the computer executable instructions are configured to determine at least one word included in a statement from the one or more customer statements, that determination might be based in part on the statistical language model. In some embodiments in which the one or more models in the computer memory comprise a statistical language model, one or more of the model updates might comprise an update for the statistical language model.

In some embodiments, the set of computer executable instructions might be configured to determine a meaning, that is, a significance, of a statement from the one or more customer statements. In some such embodiments, one or more of the models in the computer memory might comprise a semantic classification model, which might be used to determine the meaning of a statement from the one or more customer statements. In some embodiments wherein the one or more models in the computer memory comprises a semantic classification model, one or more of the model updates might comprise an update for the semantic classification model.

In some embodiments, the one or model updates might comprise one or more updated models. In some embodiments, the set of computer executable instructions might be configured to automatically update one or more of the models using one or more of the model updates in response to a trigger. In some embodiment, that trigger might be a usage milestone.

In some embodiments, the computer memory, either in addition to, or in alternative to, the contents described above, might comprise a set of potential call dispositions, an indication of the desirability of the call dispositions and/or a record of a disposition for a customer interaction.

Further, in some embodiments, the set of computer executable instructions might be further configured to coordinate processing of the customer interaction through implementation of one or more actions.

In addition to the above, some embodiments of the invention might comprise a computerized system for improving an interactive voice response system. Such embodiments might comprise an interactive voice response system, a decision agent, and a feedback system. In such embodiments, the interactive voice response system might be activated by initiation of a customer interaction, and the decision agent might be configured with a set of computer executable instructions to determine a route through the interactive voice response system. In embodiments where the decision agent is configured with a set of computer executable instructions to determine a route through an interactive voice response system, the determination might be made based on a set of information related to a customer interaction and a predication model. In some embodiments, upon completion of a customer interaction, the interactive voice response system might be configured to transfer the customer to a customer service representative. The customer service representative might then determine a customer satisfaction level, that is, a measure of the customer's thoughts and/or feelings, with the interactive voice response system. That customer satisfaction level might be reported to the feedback system, which might then use it to modify the prediction model used by the decision agent.

Some embodiments might comprise a computer readable medium having computer executable instructions for performing the method comprising the steps of: capturing a natural language statement made during an interaction with a self care system; automatically creating a textual representation of the natural language statement using a computer program; associating the textual representation of the natural language statement and a set of context information corresponding to the natural language statement; adding the textual representation of the natural language statement and the set of context information to a first data record; merging the first data record and a second data record to create a third data record, the second data record comprising a set of information related to an interaction with an assisted care system; automatically generating a statistical language model based at least in part on the third data record; and updating the computer program using the statistical language model.

Further, some embodiments might comprise a computer readable medium having computer executable instructions for performing the method comprising the steps of: capturing a natural language statement made during an interaction with a self care system; automatically creating a textual representation of the natural language statement; automatically creating a classification corresponding to the natural language statement; adding the textual representation and the classification to a first data record; appending the classification to a second data record, the second data record comprising a set of information related to an interaction with an assisted care system; merging the first data record and the second data record to create a third data record; automatically generating a semantic model based at least in part on the third data record; and updating the computer program using said semantic model.

BRIEF DESCRIPTION OF THE DRAWINGS

FIG. 7 is a table which shows potential data which might have been collected about the processing of 1,200 calls in some embodiments.

FIG. 8 is a table which shows potential data which might have been collected about the processing of 2,400 calls in some embodiments.

FIG. 9 is a table which shows potential data which might have been collected about the processing of 1,200 calls in some embodiments.

DETAILED DESCRIPTION OF THE EMBODIMENTS

All embodiments described herein are intended to be illustrative and, therefore, non-limiting.

Figure 1:
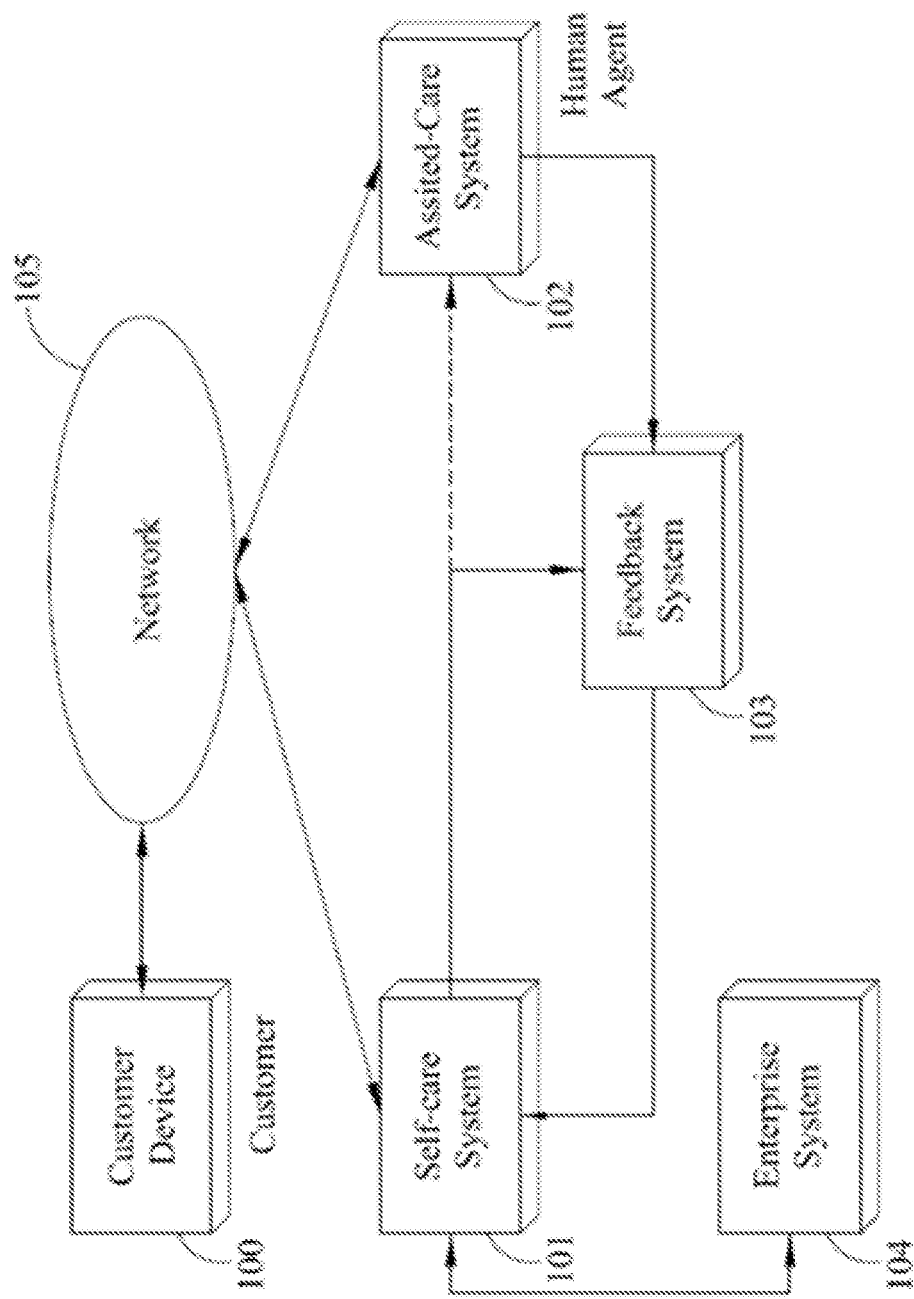
FIG. 1 provides a high level illustration of some major components which might be present in some embodiments.

Some embodiments might include one or more of the major components depicted in FIG. 1. In embodiments following FIG. 1, an interaction between a customer [100] and an SCS [101] might be initiated by a customer [100] contacting the SCS [101] over a network [105], which might be any type of network capable of transmitting call audio information, such as the public switched telephone network (PSTN) or a broadband voice over IP (VoIP) network. Once the call had been received, the SCS [101] might play some prompt, such as "How may I help you?" which would be transferred back over the network [105] to the customer [100]. In determining how to respond to the customer's statement, in some embodiments, an SCS [101] might request data from some external system, referred to in FIG. 1 as an enterprise system [104]. Additionally, in some embodiments of the present invention, the SCS [101] might have the capacity to transfer the customer call to an ACS [102]. Finally, in some embodiments, when the customer call is terminated, a feedback system [103], which could be a set of software routines and their associated hardware designed to improve the performance of an SCS, might be able to update the SCS [101] so that the SCS [101] might be able to better respond to customer statements in the future.

Figure 2:
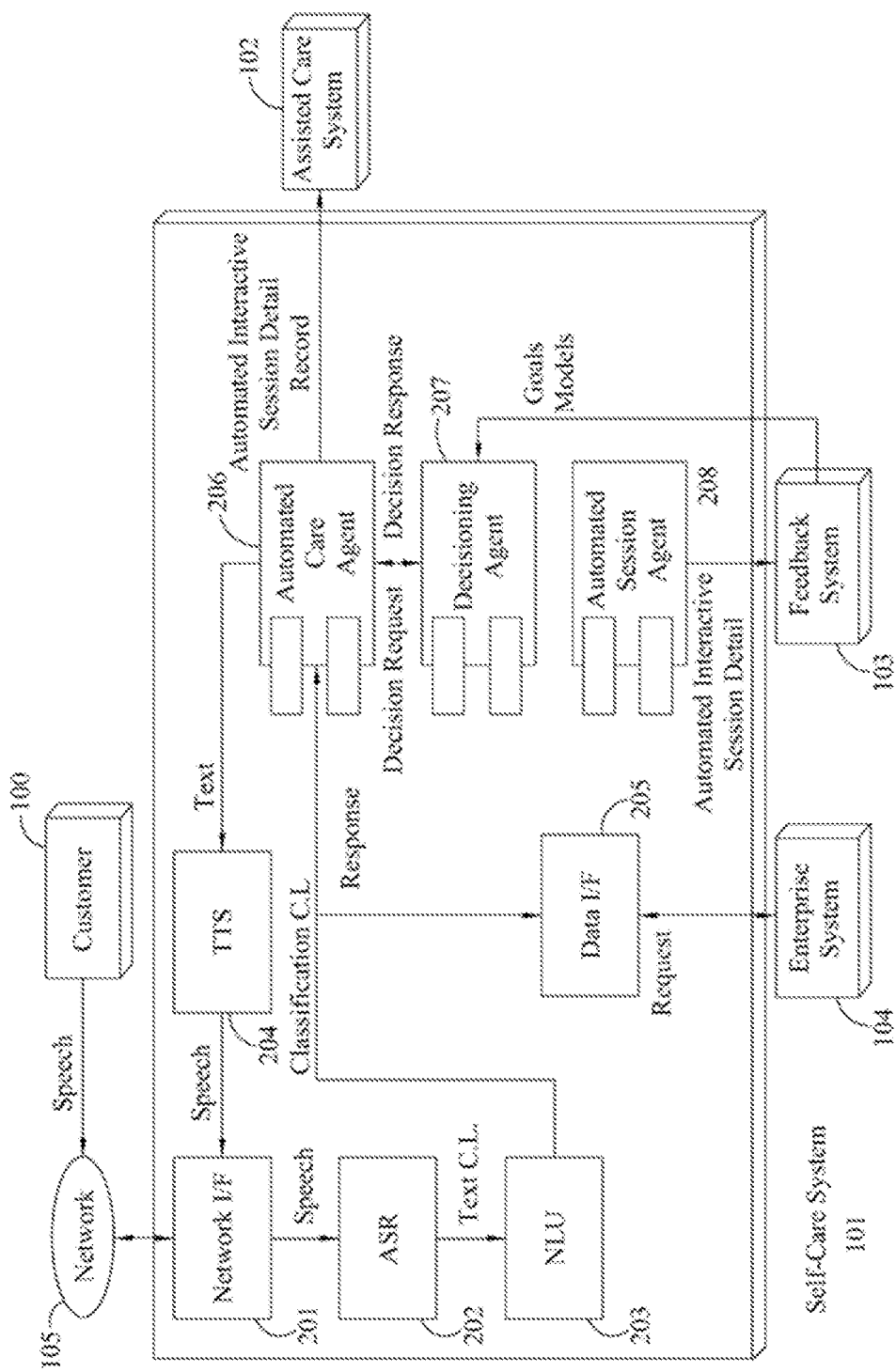
FIG. 2 provides an illustration of a conceptual architecture of an SCS which might be implemented in some embodiments.

FIG. 2 expands on FIG. 1 and focuses particularly on a conceptual architecture for an SCS [101] which might be realized in some embodiments. For the sake of easy understanding, numbering is consistent throughout all figures. In the diagram of FIG. 2, in addition to the boxes representing subcomponents of an SCS [101], there are also labeled arrows which describe types of data which might be passed between components in some embodiments. It should be understood, however, that the diagram of FIG. 2 is intended to be illustrative only of a particular type of conceptual architecture which might be implemented in an SCS [101], and therefore is not intended to be limiting of the components which might be present in all embodiments.

It should further be understood that, while certain data transfers are depicted using arrows in FIG. 2, those arrows do not necessarily depict all data transfers which might take place in an embodiment following the conceptual architecture of FIG. 2. For example, some embodiments following the architecture of FIG. 2 might have an SCS [101] which includes a set of software routines specialized for gathering data related to the processing of a customer call by an SCS [101] (hereinafter collectively referred to as an Automated Session Agent (ASA) [208]). In some embodiments, regardless of the fact that there are no arrows showing data being transmitted to an ASA [208], an ASA [208] might collect data related to the processing of a customer call, perhaps by monitoring data transmissions between other components, perhaps by means of discrete data transmissions from other components, or perhaps by some other means, depending on the specifics of a particular embodiment. Further, even though FIG. 2 only shows an arrow from the ASA [208] leading to a Feedback System [103], in various embodiments an ASA [208] might communicate information to other components as well. For example, in some embodiments, an ASA [208] might transfer context information, that is, data related to the processing of a customer call by an SCS [101] which might include data related to the customer himself or herself, to other components of the SCS [101], either on request or automatically in response to certain triggers. Further, various embodiments might have different sets of information included in the context information maintained and transmitted by an ACA. For example, in some embodiments, context information might include outputs from various other components of the SCS [101], data received from an enterprise system [104], the duration of the customer interaction, and customer information such as the customer's name, emotional state, account information, lifetime value, previous interactions, telephone number, etc. Other embodiments might maintain context information which contains only some of the above data, or might maintain context information which contains different data entirely. Thus, while FIG. 2 is intended to provide an illustrative example of a potential conceptual architecture which might be realized in some embodiments, it is not intended to be limiting on the scope of the invention.

In embodiments which follow FIG. 2, an SCS [101] might include a network interface [201] which might be configured to receive information, such as speech, from a network [105]. Once the network interface [201] receives information, it might transfer any speech information to Automatic Speech Recognition software [202] (hereinafter, referred to either as ASR software, or simply as an ASR), which is computer software configured to translate audio input comprising a natural language statement into an alternate format, such as text. The ASR [202] might create a textual representation of the information transferred to it using a statistical model which calculates the probability that, given the context of an interaction, a phrase made up of one or more words will be spoken by a customer. For the sake of convenience, such models will be referred to throughout this application as Statistical Language Models (SLMs). In some embodiments, the ASR [202] might additionally produce a confidence level, which may be alphanumeric although other schemata are possible. The confidence level may indicate the probability that each word in the textual representation accurately reflects the content of the call audio received by the network interface [201]. Once the ASR [202] has finished processing, it might send data such as its textual representation of call audio, either with or without the associated confidence level, to a NLU unit (referred to throughout the application as either an NLU unit or simply as an NLU) [203]. The NLU [203] might then attempt to classify the text provided by the ASR [202] into one of a set of predefined values, such as "Printer Problem,"

through the use of a semantic classification model (SCM), a technique which is well known to one of ordinary skill in the art. In some embodiments, in addition to classifying text provided by an ASR [202], an NLU [203] might also provide a confidence level, which might indicate the probability that the NLU's classification is correct.

In some embodiments, once a classification has been made by an NLU [203], that classification, either with or without an associated confidence level, might be forwarded to a set of software routines specialized to coordinate the components of the SCS [101] with each other, an ACS [102], the customer [100], the network [105], enterprise systems [104], and the feedback system [103]. For the sake of convenience, such specialized software routines will be referred to collectively as an Automated Care Agent (ACA) [206]. In some embodiments, an ACA [206] might be implemented in a computer language such as C++, Java, or VXML.

In some embodiments, an ACA [206], might be designed as a set of actions, that is computer executable commands or functions and transitions, that is, triggers which lead to the execution of a new action. As an example of such a design, consider the diagram of FIG. 12A. In an embodiment following FIG. 12A, when a call is initially received by an SCS [101], the ACA [206] might be programmed to execute the action of playing a prompt [1200]. After that action was complete, the ACA might automatically transition to the next action of getting a statement from the customer [1201]. In such a case, the trigger for moving between the second and third actions is the completion of the second action. After the ASR had transcribed the customer statement, an ACA following the diagram of FIG. 12A might automatically transition to the action of sending the transcription to the NLU [1203]. Once the NLU was finished processing the statement, an ACA following the diagram of FIG. 12A might face a choice: if the NLU understood the transcription, the ACA might order a service ordered by the customer [1204]; if the NLU did not understand the transcription, the ACA might play a prompt asking the customer to repeat his or her statement [1205].

Figure 12A:
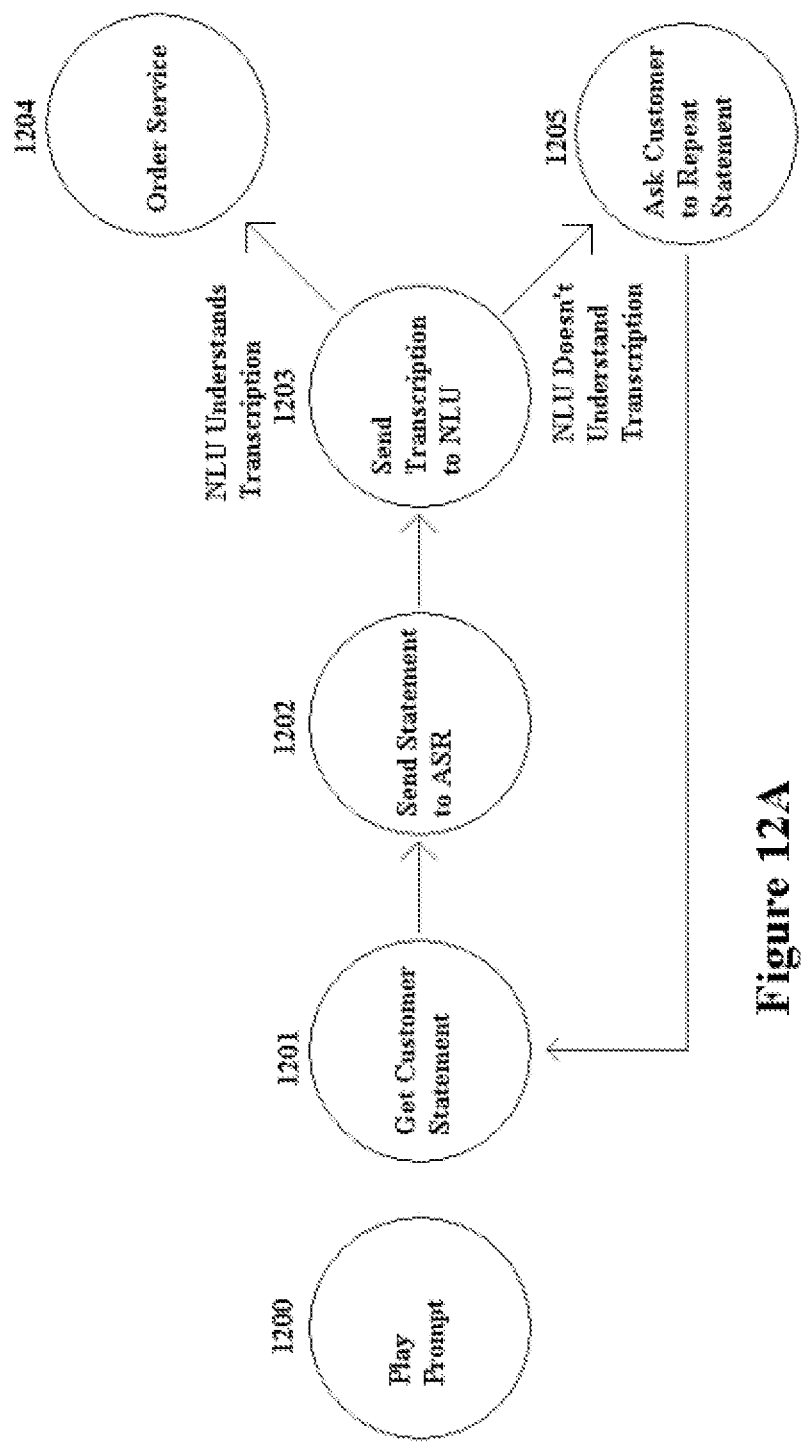
FIG. 12A is a diagram showing a simplified design model which might be implemented in some embodiments.
Figure 12B:
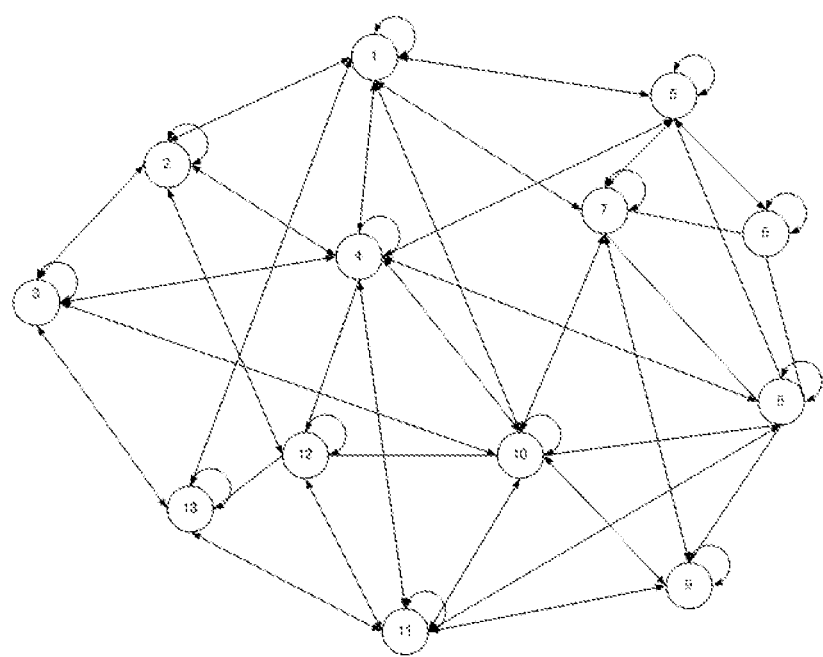
FIG. 12B is a diagram showing a simplified design model which might be implemented in some embodiments.

It should be understood that the above example of actions and transitions based on FIG. 12A is a simplified overview designed to illustrate an ACA design which might be utilized in some embodiments. It should further be understood that various embodiments might differ from the simplified example based on FIG. 12A in any number of particulars. For example, an embodiment might include a greater number of actions, such as requesting that an Enterprise System provide an account balance or adjust a bill; or redirecting a customer interaction, perhaps by routing the customer call to an ACS. Various embodiments might also include a greater number of transitions, or even be designed in such a way that certain actions are configured to transition back to themselves, that is, to loop, as can be seen in the diagram of FIG. 12B. Further, in some embodiments, there might be both actions which are composite, that is, composed of other actions, and actions which are atomic, that is, not composed of other actions. For example, some embodiments might include a composite action of "get customer input," which might be composed of the constituent atomic actions of "get audio data from the network," and "send audio data to the ASR." Additionally, some embodiments might include actions which are synchronous, that is, which prevent other actions from being taken while they are being processed, and actions which are asynchronous, that is, which can be processed concurrently with other actions. Further, some embodiments might include an ACA [206] which is based on a different model entirely. For example, in some embodiments in which an ACA [206] is utilized in an IVR System, rather than being implemented as a set of actions and transitions, the ACA might be implemented as a set of algorithms which invokes, and controls the inputs to and outputs from, other components of the SCS [101]. For the sake of convenience, such an embodiment will be referred to as having an ACA which determines a route through the IVR, though it should be understood that the discussion throughout the application which refers to ACAs using actions is equally applicable to ACAs which determine a route through an IVR.

Returning to the diagram of FIG. 2, in addition to the components described above, some embodiments might include software routines specialized to assist an ACA [206] in making decisions between options, which are methods of processing a customer call or coordinating components of an SCS and other systems, such as actions or routes through an IVR. For the sake of convenience, in embodiments in which they are present, such specialized software routines will be referred to as a Decisioning Agent (DA) [207]. In some embodiments, an ACA [206] might request a recommendation from a DA [207] whenever the ACA [206] needed to transition from one action to another, or whenever the SCS [101] received additional data, either from the customer [100], an enterprise system [104], or from some other source. Alternatively, in some embodiments, an ACA [206] might only request a recommendation from a DA [207] in certain situations. For example, some embodiments might be configured such that some transitions are controlled by well defined rules, while other transitions are uncertain, and require a recommendation from the DA [207]. An example of such an embodiment might be one where the ACA [206] is configured to automatically respond if the NLU [203] provides an understanding of a customer statement with a confidence level greater than a set threshold (say, 95% certainty), while the ACA [206] might request a recommendation from the DA [207] if the confidence level provided by the NLU [203] is below the threshold.

In embodiments in which a DA [207] is present, the DA [207] might use various methods for determining what action from a set of actions to recommend. For example, in some embodiments, a DA [207] might make decisions as to what action to take, or route to recommend, using predictive modeling which would indicate the desirability of likely outcomes of various actions or routes. In some embodiments in which a DA [207] utilizes predictive modeling when making recommendations, the DA [207] might be configured with information regarding potential dispositions, or outcomes, of a customer interaction. Such dispositions might include call outcomes such as the customer abandoned the call, the customer purchased a service, or the customer had his or her question answered after the call had gone on for a certain length of time. The DA [207] might also be configured with information related to the desirability of certain dispositions, and it might further be configured to dynamically keep track of certain information, such as the length of the phone call (also known as call hold time), in order to help measure system performance or determine the likelihood of certain dispositions. In some embodiments in which a DA [207] includes information about dispositions and their desirability, and uses predictive modeling to make recommendations regarding actions, the predictive models used by the DA [207] might be based on conditional probabilities. For example, in order to determine whether to take a specific action, in some embodiments, a DA [207] might assign an expectation score to each disposition by multiplying the conditional probability that the given action would result in that disposition occurring, given information such as the context information gathered by the ASA [208], information maintained by the DA

[207], and other information relevant to the customer interaction, by the desirability associated with that disposition. The DA [207] might then create a similar expectation score for each disposition, and might combine those scores into a final score, called an alignment, for an action. The DA [207] might create a similar alignment for each action, and recommend the action whose associated alignment was greatest. Such a calculation, which might be undertaken in some embodiments, could be represented as follows:

$$\text{Action} = \max(\text{Action})\left\{\text{Alignment} = \sum_{\text{Disposition}} P(\text{Disposition} | \text{Action}, \text{InteractionContext}) \cdot \text{GoalValue}(\text{Disposition})\right\} \quad \text{Function 1}$$

where P(Disposition|Action, InteractionContext) is the conditional probability that Disposition will result from Action given InteractionContext, GoalValue(Disposition) a numeric value indicating the desirability of Disposition and Alignment is the final score assigned to a particular action.

In addition to having various methods of determining what actions from a set of actions to recommend, different embodiments might also have different methods of determining a set of actions that the DA [207] evaluates. For example, in some embodiments, when an ACA [206] makes a request of a DA [207], the ACA [206] might send the DA [207] a list of actions for the DA [207] to choose from. Alternatively, some embodiments might be implemented such that the DA [207] determines a set of actions to choose between based on context information about the customer call. In some embodiments, there might be some situations where an ACA [206] sends a list of actions to a DA [207], while in other situations the DA [207] is required to independently determine potential actions to judge.

Various implementations might also differ from one another in the sources and nature of the information used by the DA [207]. For example, in addition to the factors set forth above, some embodiments might be designed to allow a DA to take information such as a measurement of the caller's emotional state, the number of times a caller has been asked for information to clarify an earlier response (referred to as reprompts), or various utterance keywords, that is words with particular significance, detected in a customer statement. In some embodiments, this might entail making alterations in other components of an SCS [101] in order to facilitate processing by a DA [207]. For example, in some embodiments, an ASA [208] might be specially configured to be able to measure the caller's emotional state, and to communicate that information to the DA [207] as a portion of the call's context information. It should also be understood that additional methods of making determinations by a DA [207] will be apparent to one of ordinary skill in the art, and that the use of such additional methods is not inconsistent with the scope and spirit of the invention. It should be understood that the above description focused on a DA [207] which recommends an action which might be taken by an ACA [206], but that a DA [207] could use the same techniques (i.e., predictive modeling, etc. . . . ) to recommend routes through an IVR, or for other methods of making determinations to be carried out by the ACA [206].

Once the determination of the correct action had been made, either by the DA [207], the ACA [206], or some other component, the ACA [206] might implement that action, perhaps by sending a text string representing a prompt to be played to a Text To Speech (TTS) system [204]. Depending on the action implemented, the customer [100] might make another statement which the SCS [101] could analyze, repeating the above described process until either the call reached disposition, or the SCS [206] transferred the call, either to an ACS [207] or to some other system.

In some embodiments, once the SCS [101] completes its processing of the call, either because the call is transferred or for some other reason, a component of the SCS [101], for example, the ASA [208] might assemble a set of information related to the customer's completed interaction with the SCS [101]. For the sake of convenience, in embodiments where such interaction records are created, they will be referred to as Automated Interactive Session Detail Records (AISDRs). In some embodiments, an AISDR might include information describing the session, information describing the interaction with the customer [100], or both. In embodiments in which an AISDR includes information describing a session, that information might include one or more of: a session identifier; the session type, which might be "automatic" for a session conducted by an SCS [101]; the date and time of the session's start; the date and time of the session's conclusion; the session's duration; and/or the session's disposition, which in some embodiments might be automatically determined by the ASA [208]. In embodiments in which an AISDR includes information describing interaction with the customer, that information might include one or more of: actions performed by an ACA [206]; inputs from the customer, such as speech or signals generated by buttons on a touch tone phone; the data produced by the ASR [202] and/or NLU [203]; data sent from enterprise systems [104] through the data interface [205]; and/or customer information such as name, account number, customer lifetime value, the customer's previous contact history, the customer's emotional state, the customer's telephone number, and other similar information.

It should be understood that the above discussion of an SCS [101] as depicted in FIG. 2 is not intended as an exhaustive discussion of all possible embodiments, and numerous modifications and/or additions to the above discussion and diagram of FIG. 2 will be immediately apparent to one of skill in the art. For example, in some embodiments, an ASA [208] might store, or even collect, information in addition to the data transmitted between components shown in FIG. 2. Thus, in some embodiments, an ASA [208] might respond to a call arriving at an SCS [101] by collecting data about the customer [100], perhaps including the customer's name, a customer ID, the customer's telephone number, or other information, some of which might be stored on enterprise systems [104] outside the SCS [101], which the ASA [208] might access through means of an external data interface [205]. Additionally, in various embodiments, the ACA [206], the DA [207], or other components of the SCS [101] might contact enterprise systems [104] though a data interface [205], and/or the ASA [208], as needed in order to obtain information for decision-making purposes. Additionally, in some embodiments, the functionality of various components of the SCS [101] might be combined. For example, in some embodiments, the functionality of the ACA [206] and the DA [207] might be combined into a single component which coordinated all interaction within the SCS [101] and was capable of making decisions as to actions to take or routes to follow. Thus, the above discussion is intended to be illustrative only, and not to be limiting.

Returning to the high level architecture of FIG. 1, in some embodiments, an SCS [101] might be configured to be able to transfer a call to an ACS [102]. In some embodiments, when a call is transferred from an SCS [101] to an ACS [102], some or all of the information contained in the AISDR, or the AISDR itself, might be transferred to the ACS [102] as well. To illustrate how a customer interaction might be processed in an ACS [102], either with or without an associated AISDR, consider the diagram of FIG. 3, which presents a potential conceptual architecture for an ACS [102].

Figure 3:
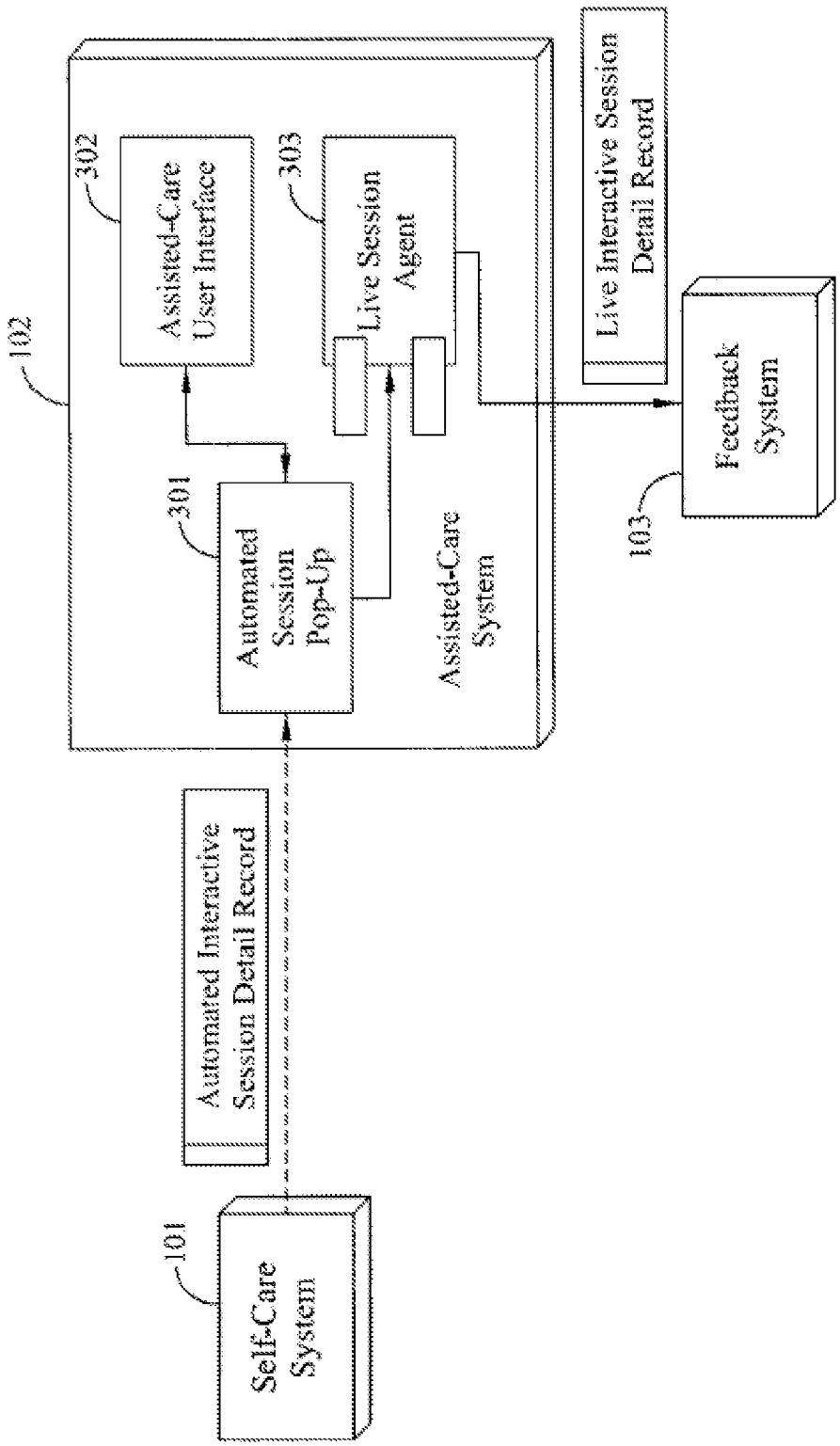
FIG. 3 provides an illustration of a conceptual architecture of an Assisted Care System (ACS) which might be implemented in some embodiments.

In some embodiments which follow FIG. 3, when a call arrives at an ACS [102], an automated session popup [301] or other display might appear on a computer terminal being monitored by a human agent, such as a customer service representative. For the sake of convenience, the computer hardware and software which an individual agent uses to process a customer call will be referred to collectively as an agent terminal. In some embodiments, the automated session popup [301] might contain a summary of the automated session which took place at the SCS [101]. In some embodiments, a summary provided by the automated session popup [301] might contain information such as a transcription of the customer's speech, provided by the ASR component of the SCS [101], the reason for the call as determined by the NLU unit in the SCS [101], and/or information about the customer, which might be culled from an AISDR provided when the call was transferred from the SCS [101] to the ACS [102]. Regardless of the contents or existence of a summary provide by the automated session popup [301], the ACS [102] would process the customer through a human agent, who would interact with the customer through an assisted care user interface [302].

In some embodiments, while the interaction between the human agent and the customer was taking place, software routines similar to the ACA [208] from FIG. 2, which will be referred to collectively as a live session agent (LSA) [303], might gather information summarizing the processing that takes place in the ACS [102]. In some embodiments, that information might be compiled into a Live Interactive Session Detail Record (LISDR) which might contain information describing the session and/or information describing the disposition of the customer call. In embodiments where an LISDR contains information describing the session, that information might include one or more of: a session identifier; a type identifier, which might be "live" in some embodiments for sessions processed by an ACS [102]; a short indication of the disposition of the call (which might be determined either by the agent processing the customer call, or by the LSA automatically); and/or a listing of actions performed while the call was being processed by the ACS [102]. In some embodiments where an LISDR contains information describing the disposition of the customer call, that information might include one or more of: an indication of the level of customer satisfaction with the call; and/or information as to whether or not the call was transferred correctly by the SCS [101]. In some embodiments, an LISDR might also include an indication of the agent's determination of how satisfied the customer was with the interaction, referred to as a customer satisfaction level. In some embodiments in which both an LISDR and an AISDR are compiled, and both the LISDR and AISDR include a session identification, the session identification in both the LISDR and AISDR might be coordinated, and might later be used to correlate an ACS session described in an LISDR with the appropriate SCS session described in an AISDR.

In some embodiments, even after a call has reached disposition, further processing might take place, which might have the effect of improving the performance of an SCS. To discuss one type of processing which might take place after a call had reached disposition, consider the diagram of FIG. 4, which illustrates a potential architecture for a feedback system which might be implemented in some embodiments.

Figure 4:
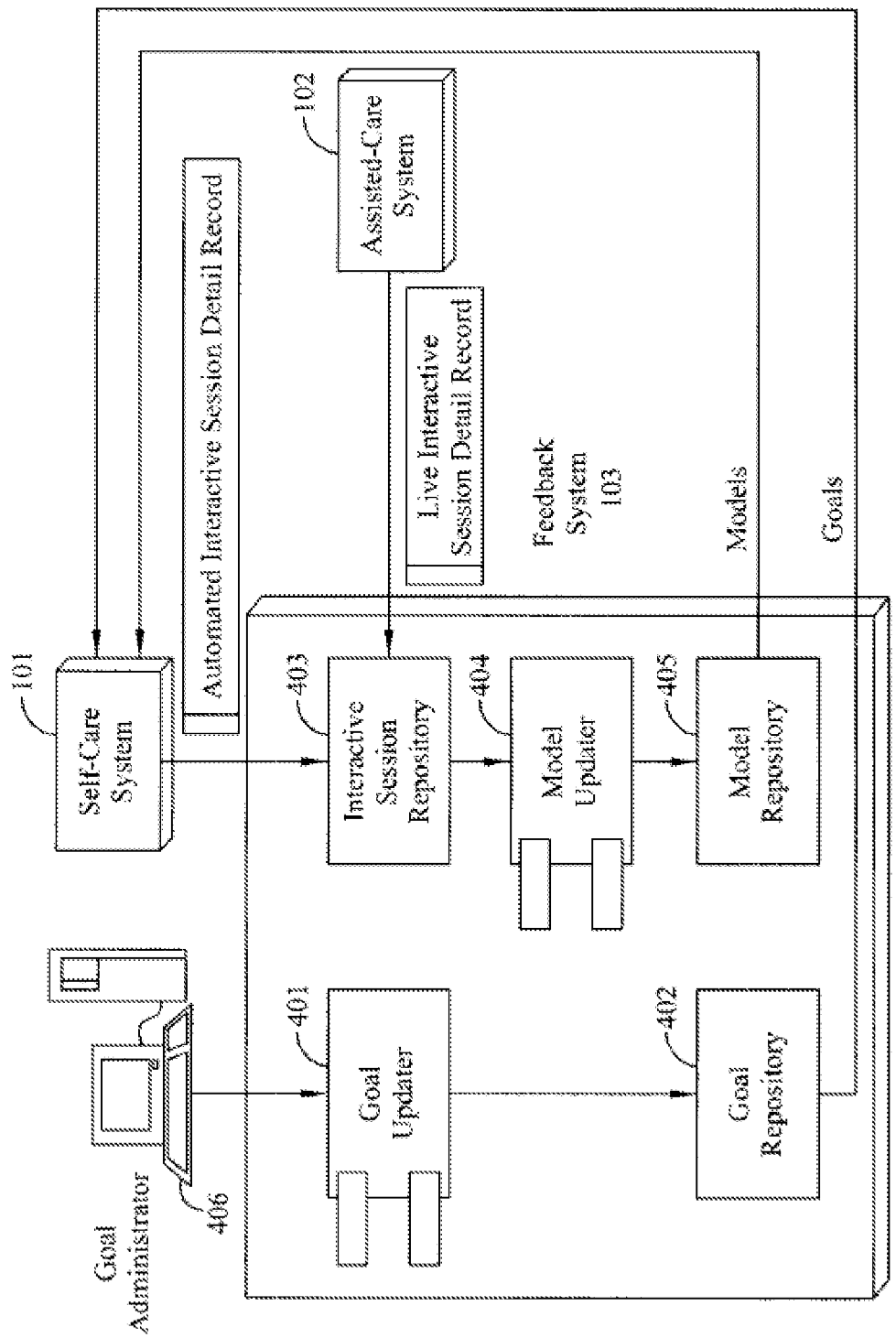
FIG. 4 provides an illustration of a conceptual architecture of a feedback system which might be implemented in some embodiments.
Figure 5:
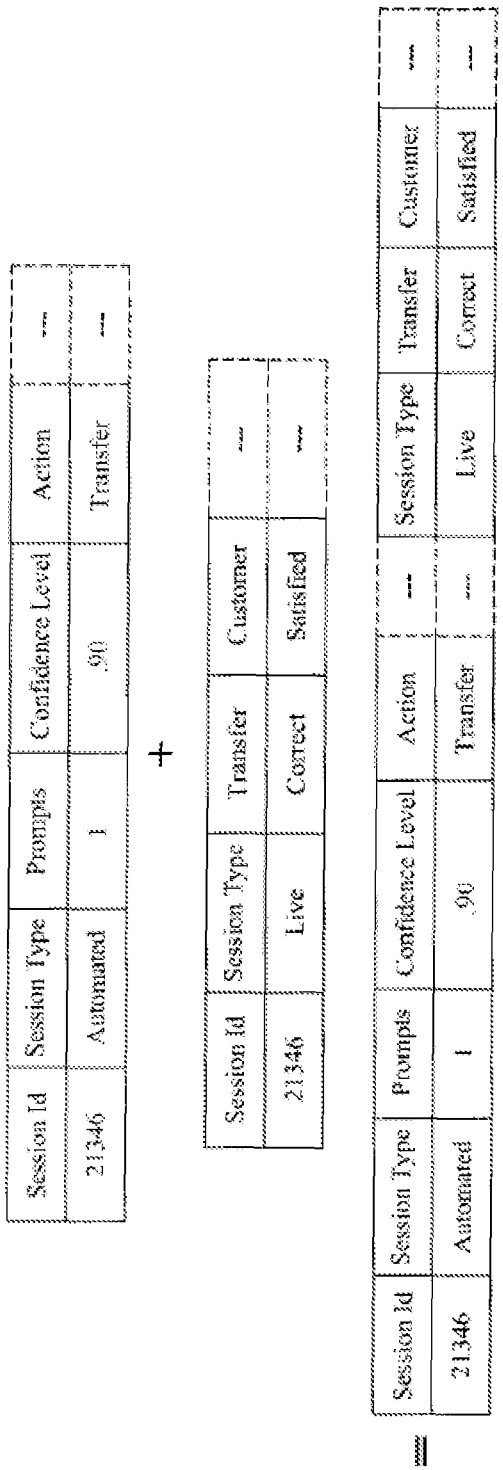
FIG. 5 shows a combination of two data records which might take place in some embodiments.

In some embodiments following the architecture of FIG. 4, once a call has reached disposition, an SCS [101] and/or an ACS [102] might transfer information describing their interactions with the customer to the feedback system [103]. In some embodiments, that information might be contained in an LISDR, an AISDR or both. In some embodiments, the feedback system [103] might include one or more software routines specialized to assemble and store data related to call processing undertaken by an SCS [101] and/or an ACS [102]. For the sake of convenience, such software routines will be referred to collectively as in interactive session repository (ISR) [403]. In embodiments containing an ISR [403], the ISR [403] might be designed such that, when a call was processed by both an SCS [101] which produces an AISDR and an ACS [102] which produces an LISDR, the ISR [403] might use the session identifications on the LISDR and AISDR to combine the two data records into a Closed Loop Interaction Data Record (CLIDR), as shown in FIG. 5. In some embodiments, after correlating the data provided by the SCS [101] and ACS [102], the ISR [403] might store the correlated data for later use, perhaps by other components of the feedback system [103].

One potential use for the data stored in the ISR [403] is updating and/or generating of the models used in the SCS, which might be done by a set of specialized software routines which perform statistical correlations and calculations, which, for the sake of convenience, will be referred to collectively as a model updater (MU) [404]. For the sake of convenience, the data created by such a MU [404] for the purpose of updating a model used by a component of an SCS [101] will be referred to as a model update. In some embodiments, the MU [404] might generate new models or model updates by organizing the data collected by the ISR [403] into different groups based on context information, then organizing each of those context groups according to recommendations which might be made by a DA, and then organizing each of those recommendation groups based on call disposition, and finally using that organization of raw data to determine a conditional probability of a particular recommendation resulting in a certain disposition given a call context.

Of course, it should be understood that, while an MU [404] might employ different algorithms for generating models updates and for generating new models, in some embodiments, the model updates generated by an MU [404] might be new models based on models already being used by a component in an SCS [101]. In such an embodiment, the model updates might improve the performance of the SCS [101] by simply replacing the models currently being used by the SCS [101], rather than by modifying them only. Thus, the above linguistic distinction between model updates and the generation of new models should be understood as one made for the sake of convenience only, and not read to imply that model updates must necessarily be distinct from new models.

Additionally, in some embodiments, data stored in the ISR [403] might be used to update/generate semantic classification models which can be used in an NLU within an SCS [101]. For example, consider an embodiment which includes a CLIDR stored in an ISR [403] comprising a semantic classification made by an NLU within an SCS [101], a textual rendition of the caller's statement provided by an ASR within an SCS [101], and a correct semantic classification provided by a human after the call had been transferred to an ACS [102]. In such an embodiment, if the human within the ACS [102] and the NLU within the SCS [101] had come to different conclusions about the correct classification of the caller's statements, the semantic probability models used by the NLU within the SCS [101] could be updated by correlating the text of the caller's statements with the correct classification as provided by the human within the ACS [102]. In this way, some embodiments might provide for adjusting semantic classification models used by an NLU within an SCS [101] in an automatic, closed loop manner.

Additionally, in some embodiments, data stored in the ISR [403] might be used to update/generate statistical language models which can be used in an ASR within an SCS [101]. For example, consider the embodiment of the previous example, which included a CLIDR stored in an ISR [403] comprising a semantic classification made by an NLU within an SCS [101], a textual rendition of the caller's statement provided by an ASR within an SCS [101], and a correct semantic classification provided by a human after the call had been transferred to an ACS [102]. In such an embodiment, in addition to updating the semantic classification models within the NLU, an SLM utilized by an ASR could be updated by analyzing the words and phrases which make up textual renditions of caller statements and modifying the SLM based on the measurements of the words and phrases in the CLIDR. In this way, some embodiments might provide for adjusting SLMs utilized by ASRs within an SCS [101] in an automatic, closed loop manner.

In some embodiments, when an MU [404] updates a model, that model might be stored by a set of specialized software routines which archive probability models. For the sake of convenience, such specialized software routines will be referred to collectively as a model repository (MR) [405]. In some embodiments, an MR [405] might contain an archive of past models, as well as any new models and/or model updates provided by an MU [404].

In some embodiments, when an MU [404] creates a model update, that update might be communicated to an SCS [101] and might be incorporated into the SCS [101] immediately as it is created (i.e., in real time). Alternatively, in some embodiments, instead of communicating updates to an SCS [101] in real time, an MU [404] might communicate with an SCS [101] only in response to certain triggers, that is, in response to the fulfillment of a set of conditions. In some embodiments, such triggers might be time based, that is, a feedback system [103] might be configured to provide scheduled updates to an SCS [101]. In some embodiments, triggers for the MU [404] might be based on usage milestones, e.g., an MU [404] might send an update to an SCS [101] if ten new CLIDRs are created within a two minute period. In some embodiments, multiple types of triggers might be present, for example, a feedback system [103] might be configured to provide scheduled updates to an SCS [101], and to provide unscheduled updates if certain usage milestones are met.

Figure 6:
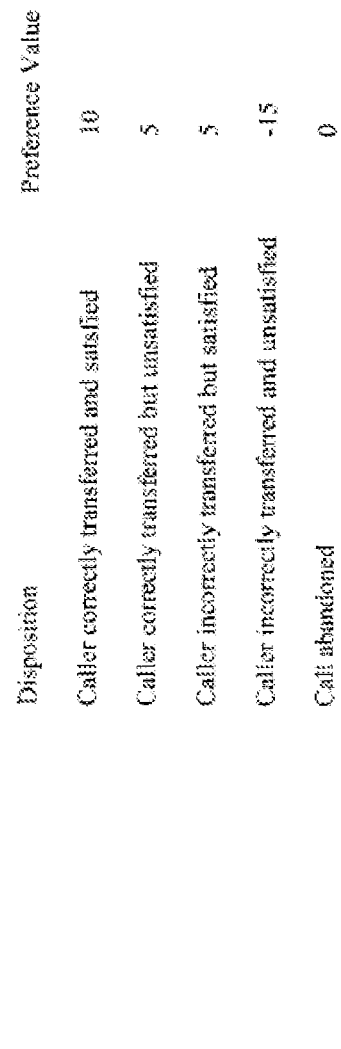
FIG. 6 is a table which shows a format in which disposition information and relative desirability might be stored in some embodiments.

In some embodiments, in addition to components to update models used in an SCS, a feedback system [103] might also include data related to the desirability of certain call dispositions, and/or means of creating and/or modifying that data. In some embodiments, there might be software routines specialized for creating and/or modifying data related to the desirability of certain dispositions, which will be referred to collectively, along with any associated hardware, as a Goal Updater (GU) [401]. In some embodiments, the GU [401] might allow a human agent, referred to as a Goal Administrator (GA) [406] to specify certain goals, such as "Minimize Call Hold Time," and then assign values, which might be alphanumeric, to dispositions indicating their desirability vis-à-vis the defined goals. For example, for the goal "Minimize Call Hold Time," the goal administrator might assign a goal value of 10 for a call which lasts less than one minute, a goal value of 5 for calls which last between one and two minutes, and a goal value of −10 for calls lasting longer than two minutes. In some embodiments, rather than having goals and dispositions, a feedback system might have only dispositions, which might be defined by the GA [406]. In some such embodiments, the dispositions and their corresponding values indicating desirability might be stored using a table representation, as shown in FIG. 6.

In some embodiments, when a GA [406] has utilized a GU [401] to create and/or modify goals, dispositions or their associated preference values, the updated information might be stored by a set of software routines specialized to store dispositions, goals and preference values. For the sake of convenience, in embodiments where such routines are present, they will be referred to collectively as a goal repository (GR) [402]. In some embodiments, in addition to storing updated information provided by a GU [401] a GR [402] might also archive past goals, dispositions, and numeric preference values.

In some embodiments, a human administrator such as the GA [406] might have responsibilities beyond those related to updating and modifying goals, dispositions and numeric preference values. For example, in some embodiments where model updates created by an MU [404] are provided by a feedback system [103] to an SCS [101] in response to triggers, the update triggers might be defined by a GA [406]. Indeed, in some embodiments, a GA [406] might be responsible only for defining triggers, and not be responsible for updating and/or creating goals, dispositions and preference values.

The foregoing should be considered as illustrative only of certain embodiments, and that numerous modifications will be readily apparent to one or ordinary skill in the art. For example, some embodiments might have multiple GAs with each GA having responsibility for a specialized task. Further, modifications to the conceptual architectures discussed above will be readily apparent to one of skill in the art. For instance, different embodiments might have diverged from the discussion above in the specifics of the types of data communicated between components, or the paths which data travels, both within and between components of an embodiment. For example, in some embodiments, information related to dispositions and their desirability might be stored in the DA [207] in addition to, or as an alternative to, being stored in a GR [402]. It should be understood that various data storage and redundancy schemes will be immediately apparent to one of skill in the art and are too numerous to catalog with any thoroughness. Thus, the foregoing should be considered illustrative only, and should not be treated as an exhaustive listing of the embodiments of the invention.

In order to examine the processes of utilizing prediction models, and of creating new prediction models, SLMs, and semantic classification models which might take place in some embodiments, it will be helpful to consider a simple embodiment which has certain characteristics. Please note that this embodiment is provided for, primarily, illustrative purposes and should not be considered limiting against other embodiments of the invention. First, the simple embodiment should utilize a relatively simple probability model, so that the use of that model and the updating processes can be easily followed, and expressed on paper. Second, the simple embodiment should store only minimal context information, which will allow updates based on that context information to be expressed simply. Third, the simple embodiment should be concerned with only a simple task, so that a representative discussion of call flows does not mushroom beyond the bounds of being easily expressed. Fourth, the simple embodiment should only recognize a few disposition states, so that the process of determining the most desirable and probable disposition state for a given action does not become impractical to set down on paper. One such simple embodiment might comprise an SCS which provides a natural language based call routing function, discussed below.

In embodiments in which an SCS provides a natural language-based call routing function, when a caller is connected to the SCS, the caller might be greeted with a voice prompt, such as "How may I help you?" The caller then might make a statement that describes the reason for his or her call. An SCS might then determine whether to transfer the call to an ACS, or to play another prompt for the caller. If the SCS transfers the call to an ACS, the SCS might also determine to which ACS, or agent group, the call should be transferred, depending on the embodiment. In an embodiment where an SCS provides natural language based call routing, the SCS's interaction with the call ends either when the SCS transfers the call, or the call is abandoned. Thus, a simple embodiment in which an SCS provides a natural language based routing function, there might be only two possible actions: to transfer the caller or play a prompt, and there might be only five dispositions: the call might be abandoned; the call being correctly transferred with the caller being satisfied; the call being correctly transferred with the caller being unsatisfied; the call being incorrectly transferred with the caller being satisfied; or the call being incorrectly transferred with the caller being unsatisfied. Further, the preference values assigned to those disposition states might be set as shown in the table of FIG. 6.

In such a simple embodiment, where there are only two possible actions and five possible dispositions as set forth in FIG. 6, a DA might determine which action to take by calculating the alignment of each of the two actions, and then recommending the action with the highest alignment. This might be done by applying Function 1 to the available actions, and making the simplifying assumption that the probability of a compound disposition, such as a caller being properly transferred and satisfied, can be obtained by multiplying the probability that a caller will be satisfied given that he or she was properly transferred by the probability that the caller was properly transferred given the confidence level provided by the NLU. Thus, some embodiments might make the determination of whether to transfer or prompt a caller by evaluating the following equations:

$$\text{Alignment}(T) = 10P(S|C,N)P(C|CL)+5P(U|C,N)P(C|CL)+5P(S|I,N)P(I|CL)-15P(U|I,N)P(I|CL) \quad \text{Equation 1}$$

$$\text{Alignment}(P) = 10P(CS|P,N,CL)+5P(CU|P,N,CL)+5P(IS|P,N,CL)-15P(IU|P,N,CL) \quad \text{Equation 2}$$

where N is the number of prompts which have been played for the caller, CL is the confidence level assigned to a statement classification by the NLU, S is the result of the caller being satisfied, C is the result of the caller being correctly transferred, U is the result of the caller being unsatisfied, and I is the result of the caller being incorrectly transferred. Using the above equations, and the simplifying assumption that the probability that a caller was correctly transferred given the confidence level provided by the NLU is equal to the confidence level provided by the NLU, the data from FIG. 7 can be substituted into equations 1 and 2 to give the following results:

$$\text{Alignment}(T) = 10 \times 1.0000 \times 0.900 + 5 \times 0.000 \times .9000 +$$
$$5 \times 0.000 \times 0.1000 - 15 \times 1 \cdot 000 \times 0.1000 = 7.500 \quad \text{Calculation 1}$$

$$\text{Alignment}(P) = 10 \times 0.6924 + 5 \times 0.1835 +$$
$$5 \times 0.0038 - 15 \times 0.0494 = 7.1195$$

Based on those results, the DA would recommend the action of transferring the caller, because the alignment score for transferring the caller (7.5000) was greater than the alignment score for prompting the caller (7.1195). This demonstrates how some embodiments might use predictive modeling to determine an appropriate action.

In order to understand how predictive models might be updated, assume that an embodiment following the above discussion has processed an additional 1,200 calls and that the data for the original 1,200 calls from FIG. 7, and the subsequent 1,200 calls is as shown in the table of FIG. 8. In order to update the statistical models used in a DA, an MU might recalculate the values of the probabilities that various dispositions would result from particular actions being taken in different contexts. The MU might further communicate those updated probabilities to a DA for use when processing customer calls. Thus, in some embodiments, the MU might have provided a DA new values for numeric substitutions, so that, based on the substitutions into the equations 1 and 2, the following calculations would occur:

$$\text{Alignment}(T) = 10 \times 1.0000 \times 0.9000 + 5 \times 0 \times .9000 +$$
$$5 \times 0.000 \times 0.1000 - 15 \times 1 \cdot 000 \times 0.1000 = 7.5000 \quad \text{Calculation 2}$$

$$\text{Alignment}(P) = 10 \times 0.7257 + 5 \times 0.1720 +$$
$$5 \times 0.0050 - 15 \times 0.0419 = 7.5335$$

The DA would then instruction the ACA to play an additional prompt for the caller, since the alignment for prompting the caller (7.5335) is greater than the alignment for transferring the caller (7.5000). This example shows how a simple embodiment might update the predictive models of the DA based on collected call data in a closed loop fashion without intervention from a system administrator.

While the above examples used the simplifying assumption that the probability of a caller being correctly transferred given a confidence level provided by an NLU is equal to the confidence level provided by the NLU, it is also possible to relax that assumption and calculate the probability of a caller being correctly transferred given a confidence level provided by an NLU based on historical data. In some embodiments, such a calculation might be based on the data of the table depicted in FIG. 9. In that table, the numbers in the CL column represent ranges of NLU Confidence Levels. For example, the first row (CL=(0.99,1.00]) applies for N=1, and NLU confidence levels that are greater than 0.99 but less than or equal to 1.00, while the second row (CL=(0.98,0.99)) applies for N=1 and NLU confidence levels that are greater than 0.98 but less than 0.99. Thus, the table of FIG. 9 expands on the table of FIG. 7 because the table of FIG. 9 includes 100 rows (one for each range of confidence level) for each number of prompts played, while the table of FIG. 7 only had one row per number of prompts.

Figure 9:
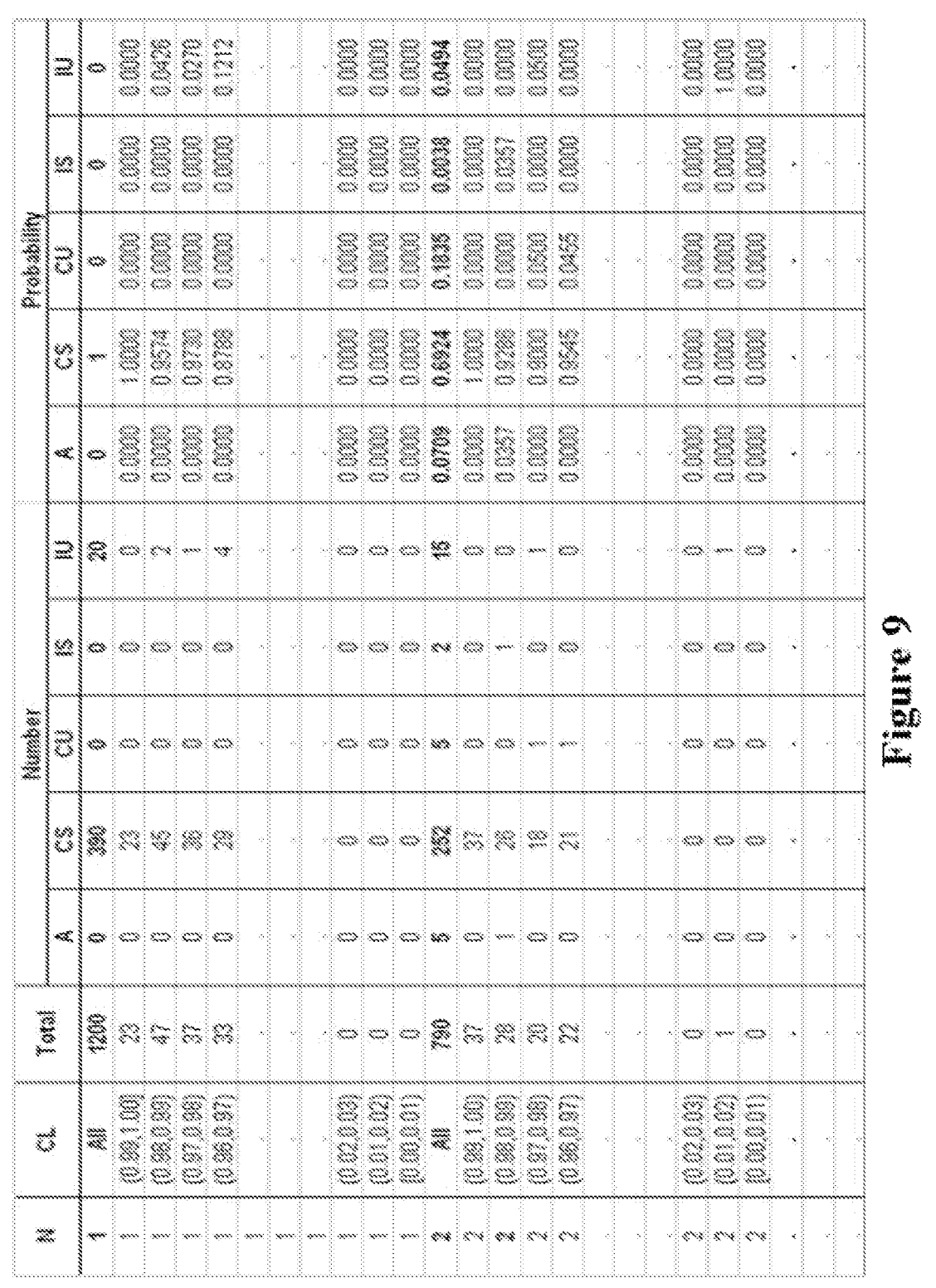

To demonstrate the use of the data from the table of FIG. 9, consider a scenario in which, after a customer responds to an initial prompt, an NLU provides a classification with a confidence level of 0.9831. In some embodiments, this might result in an ACA requesting that a DA decide whether to transfer the caller or play another prompt. The DA might then consult predictive models based on the data from the table of FIG. 9 and make the following calculations:

$$\text{Alignment}(T) = \\ 10 \times 0.9574 + 5 \times 0.000 + 5 \times 0.000 - 15 \times 0.0426 = \\ 10.2130$$

$$\text{Alignment}(P) = 10 \times 0.6924 + 5 \times 0.1835 + \\ 5 \times 0.0038 - 15 \times 0.0494 = 7.1195$$

Calculation 3

Thus, the DA would instruct the ACA to take the action of transferring the caller, since the alignment score for that action (10.2130) is higher than the alignment score for the action of playing an additional prompt (7.1195).

It should be understood that, while the above examples presented the use of simplifying assumptions separately from calculations based purely on historical data, some embodiments might use both types of calculations. For example, some embodiments might be configured to initially use the simplifying assumption that the probability that a caller is correctly transferred given the confidence level provided by the NLU is equal to the confidence level provided by the NLU, but to switch to a calculation based on purely historical data once sufficient calls had been processed for the determination based purely on historical data to be meaningful. Further, it should be understood that the above examples are not intended to be exhaustive descriptions of the particulars of utilizing and updating predictive models, and that various embodiments might use different predictive models, might use predictive models in which the parameters such as the ranges of confidence levels vary, or may use models in which parameters of data collected or the models themselves are user defined. Since these and other modifications will be immediately apparent to one of ordinary skill in the art, the above examples should be treated as illustrative only, and not limiting on the scope of the invention.

Figure 10:
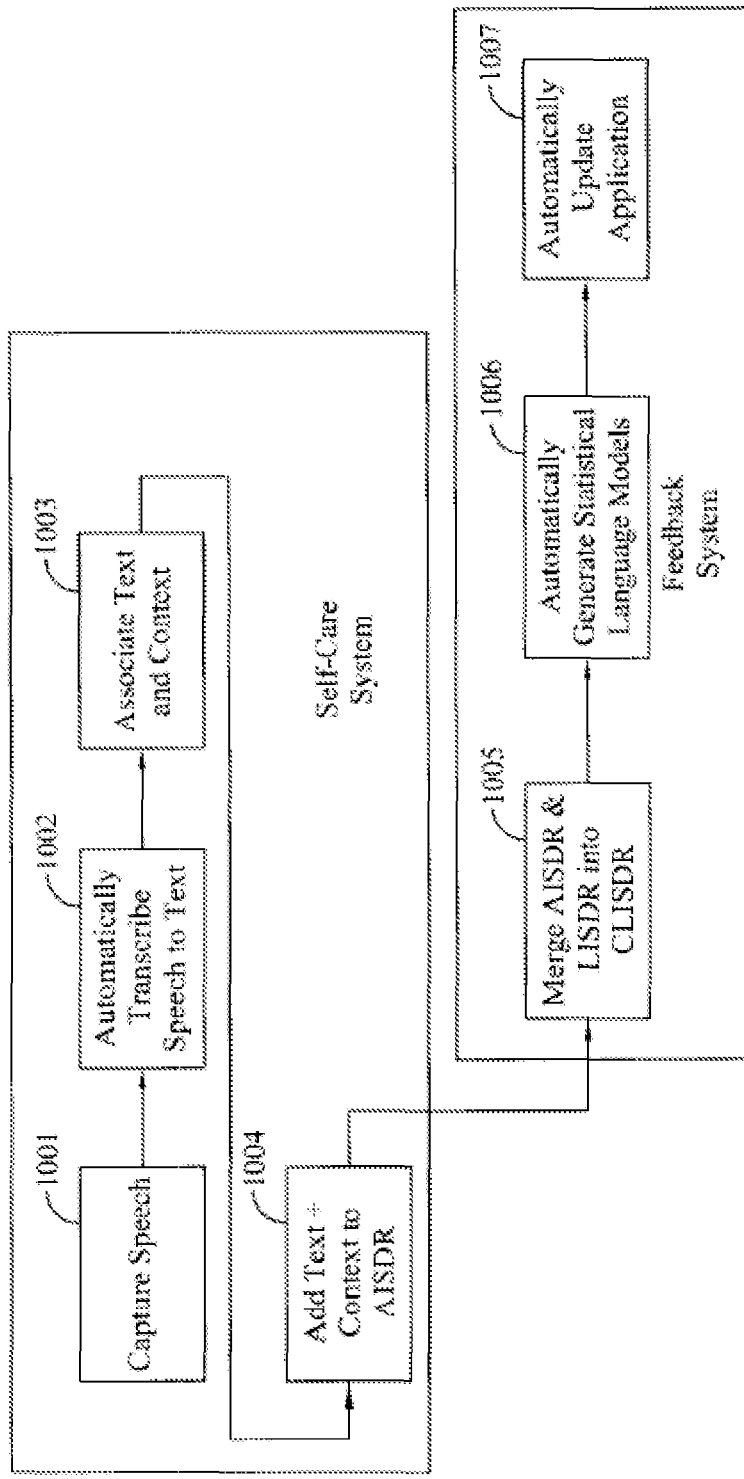
FIG. 10 is a diagram showing a potential method which could be used in some embodiments to update statistical language models.

While the above examples demonstrated the use of historical data to update predictive models used by a DA, some embodiments might also be configured to update SLMs which could be used by an ASR. To illustrate this process, consider FIG. 10, which shows a sequence of actions which might take place to update an SLM in some embodiments. In some embodiments following FIG. 10, when a customer made a statement, that statement would initially be captured [1001] and transferred to an ASR, which would automatically transcribe the statement [1002]. After the statement had been transcribed, it would be associated with context data from the call [1003], perhaps by an ASA or some other component of an SCS [101]. The text generated by the ASR and the call context data would then be combined into an AISDR [1004] which might be sent to a feedback system [103]. The feedback system [103] might then merge the AISDR with an associated LISDR to create a CLISDR [1005]. That CLISDR might then be processed using a computer program to generate a new or updated SLM [1006]. The feedback system [103] might then automatically update the SCS [101] using that new or updated SLM [1007].

Figure 11:
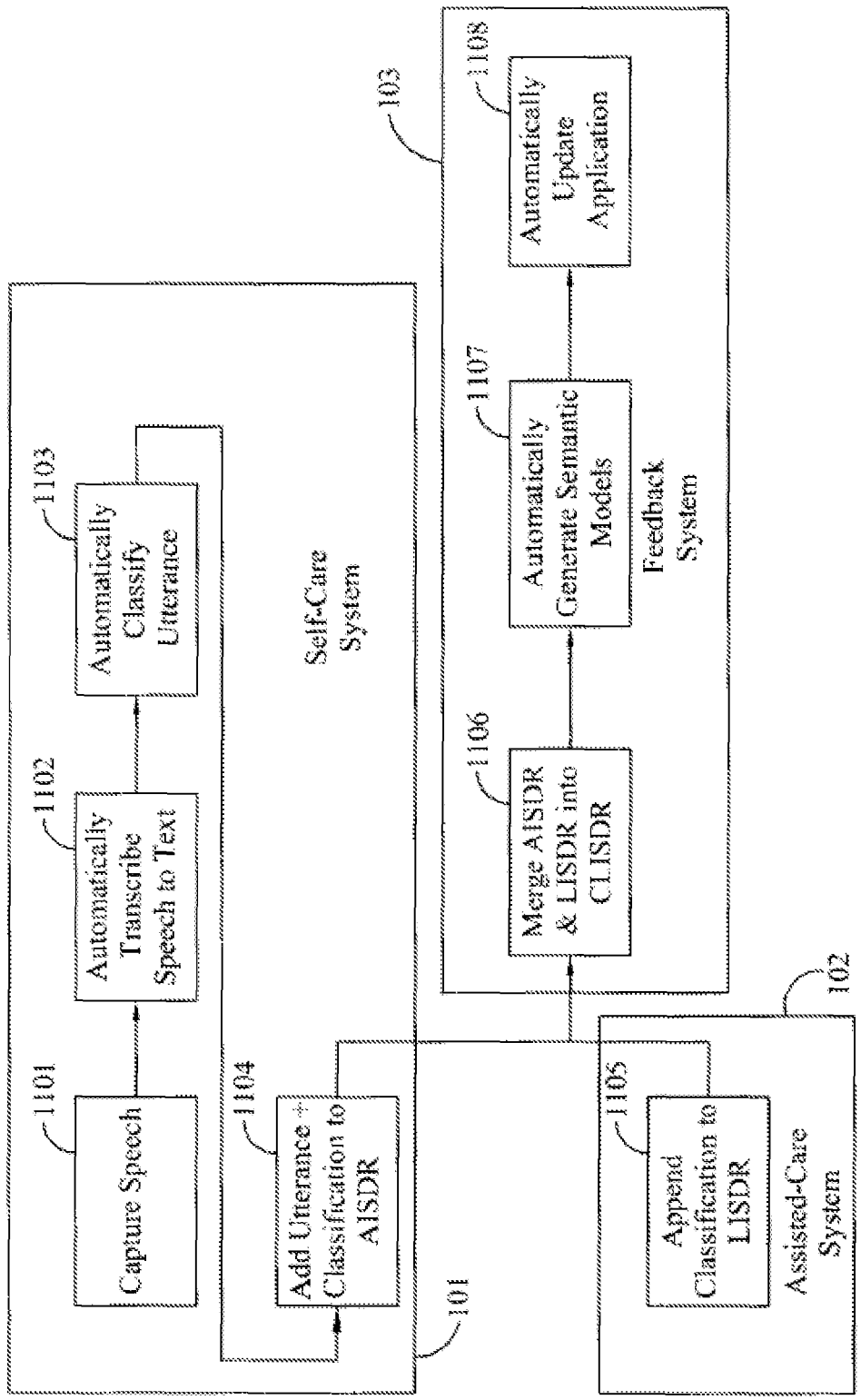
FIG. 11 is a diagram showing a potential method which could be used in some embodiments to update semantic classification models.

Similarly, FIG. 11 shows a method for automating the process of updating SCMs which might be incorporated into some embodiments of the invention. In FIG. 11, the process of updating SCMs starts with the capture of call audio data [1101], and proceeds with the automatic transcription of that data [1102]. After the data is transcribed, the process of FIG. 11 automatically classifies the utterances [1103] within the SCS [101], and adds the classification and the data to an AISDR [1104]. If necessary, an embodiment following FIG. 11 might also append a human derived classification to an LISDR [1105], and then both the LISDR and AISDR are used to generate a CLISDR [1106]. Then, in some embodiments following FIG. 11, the CLISDR might be used in the automatic generation of SCMs [1107] and those automatically generated SCMs might then be used in the automatic updating of one or more NLUs [1108].

Of course, it should be understood that the above examples are intended to be illustrative only, and that many variations and alterations will be immediately obvious to one of ordinary skill in the art. For example, the process of FIG. 11 might be altered by retaining the automatic classification of utterances, but combining that with the step of creating a corpus of thousands of utterances prior to generating updated SCMs. Thus all illustrative examples should be considered to be illustrative and not limiting on the scope of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in operation which may be resorted to are intended to fall within the scope of the invention.

The invention claimed is:

1. A system comprising:
   a) one or more processors; and
   b) a computer memory containing one or more models utilized by a processor from the one or more processors configured to process customer interactions comprising:
      i) one or more statements made by a customer; and
      ii) one or more prompts played for said customer;
   c) a computer-readable storage medium storing a set of computer executable instructions and coupled to at least one of the one or more processors, wherein the at least one processor coupled to the computer-readable storage medium is configured to execute instructions to:
      i) create a data record comprising a set of context information related to one or more of said processed customer interactions;
      ii) store the set of context information from said data record in said computer memory;
      iii) utilize the set of context information stored in said computer memory to automatically create one or more model updates without human intervention; and
      iv) automatically update one or more of said models using one or more of said model updates;
      (v) make at least one recommendation regarding processing said customer interactions, wherein the recommendation is one of replay the prompt or transfer the customer to a live agent; and
   wherein:
      a) said one or more models comprises a statistical prediction model:
      b) said processor is further configured to execute instructions to make said at least one recommendation to replay the prompt or transfer the customer based on said statistical prediction model.

2. The system of claim 1 further comprising an agent terminal configured to allow an agent to process said customer interactions;
   wherein said customer interaction further comprises one or more statements made by the agent to the customer; and
   wherein said at least one processor is further configured to execute instructions to:
      a) create a second data record comprising information related to the processing of said one or more processed customer interactions by the agent;

b) determine if said data record and said second data record contain information relating to a single customer from a single processed customer interaction, wherein said single processed customer interaction relates to said data record and said second data record;

c) if said data record and said second data record contain information relating to said single customer from said single processed customer interaction, correlate said data record and said second data record;

d) store information from said second data record in said computer memory.

3. The system of claim 1 wherein said processor is further configured to execute instructions to make said at least one recommendation based on a means for evaluating options.

4. The system of claim 1 wherein said one or more model updates created by said processor comprises an update for said statistical prediction model, which model provides a prediction value for each of at least two recommendations.

5. The system of claim 1 wherein said processor is further configured to execute instructions to:

a) identify a set of actions;

b) perform an evaluation of desirability of an action from said set of actions;

wherein said processor is further configured to execute instructions to make at least one recommendation to execute the action from the set of actions based at least in part on said evaluation of desirability of the action from said set of actions, wherein the action is one of replay the prompt or transfer the customer to a live agent.

6. The system of claim 1 wherein said one or more models in said computer memory comprises a statistical language model, and wherein said processor is further configured to execute instructions to determine at least one word included in a statement from said one or more customer statements based on said statistical language model.

7. The system of claim 6 wherein said one or more models in said computer memory comprises a statistical language model; wherein said processor is further configured to determine that as least one word included in a statement from said on or more customer statement is based on said statistical language model; and wherein said one or more model updates comprises an update for said statistical language model.

8. The system of claim 1 wherein said processor is further configured to execute instructions to determine a meaning of a statement from said one or more customer statements.

9. The system of claim 8 wherein:

a) said one or more models in said computer memory comprises a semantic classification model;

b) said processor is further configured to execute instructions to determine said meaning of a statement from said one or more customer statements based on said semantic classification model.

10. The system of claim 9 wherein said one or more model updates comprises an update for said semantic classification model.

11. The system of claim 1 wherein said one or more model updates comprise one or more updated models, said updated models comprising statistical prediction models that provide a prediction value for each of at least two recommendations.

12. The system of claim 1 wherein:

a) said computer memory further contains:

i) a set of potential call dispositions, wherein each disposition correlates to a potential outcome of said customer interaction;

ii) for each potential call disposition from the set of potential call dispositions, an indication of the potential call disposition's desirability;

iii) a record of a disposition of said customer interaction; and b) said processor is further configured to execute instructions to make at least one recommendation regarding processing said customer interaction based at least in part on the indication of the potential call disposition's desirability.

13. The system of claim 1 wherein said processor is further configured to execute instructions to automatically update one or more of said models using one or more of said model updates in response to a trigger, wherein the trigger is a usage milestone.

14. The system of claim 1 wherein said processor is further configured to execute instructions to coordinate processing of said customer interaction through the implementation of one or more actions.

* * * * *